(12) United States Patent
Jiang

(10) Patent No.: US 10,602,761 B2
(45) Date of Patent: Mar. 31, 2020

(54) COMPOSITION FOR IMPROVING QUALITY OF MEAT PRODUCTS

(71) Applicant: Kai Jiang, Guangzhou (CN)

(72) Inventor: Kai Jiang, Guangzhou (CN)

( * ) Notice: Subject to any disclaimer, the term of this patent is extended or adjusted under 35 U.S.C. 154(b) by 815 days.

(21) Appl. No.: 15/193,043

(22) Filed: Jun. 25, 2016

(65) Prior Publication Data

US 2017/0245535 A1    Aug. 31, 2017

(30) Foreign Application Priority Data

Feb. 26, 2016    (CN) .......................... 2016 1 0109593

(51) Int. Cl.
*A23L 13/70* (2016.01)
*A23L 13/40* (2016.01)

(52) U.S. Cl.
CPC ............... *A23L 13/72* (2016.08); *A23L 13/40* (2016.08); *A23L 13/428* (2016.08); *A23V 2002/00* (2013.01)

(58) Field of Classification Search
None
See application file for complete search history.

(56) References Cited

U.S. PATENT DOCUMENTS

2006/0210646 A1* 9/2006 Oku ..................... A61K 31/702
424/617

FOREIGN PATENT DOCUMENTS

| CN | 101562992 B | * | 1/2013 |
| JP | 2012-75387 A | * | 4/2001 |
| WO | WO 2014/048359 A1 | * | 4/2014 |

* cited by examiner

*Primary Examiner* — Tamra L. Dicus
(74) *Attorney, Agent, or Firm* — Mei & Mark LLP; Manni Li

(57) ABSTRACT

A composition for improving meat product quality, comprising at least 4-30 of an edible salt, 1-15 of a carbonate, 0.1-15 of an organic acid salt, 0.1-6 of a sugar alcohol, 0.1-8 of an isomaltulose and/or trehalose, and 0.01-8 of a chito-oligosaccharide composition, in weight parts. The composition has good water retention and good meat tenderizing effect, in addition to be still a good meat tenderizer after repeated freezing and cooking with the meat product being highly elastic, tender and juicy and having little loss during freezing and cooking.

14 Claims, No Drawings

COMPOSITION FOR IMPROVING QUALITY OF MEAT PRODUCTS

CROSS-REFERENCE AND RELATED APPLICATION

The subject application claims priority on Chinese patent application 201610109593.4 filed on Feb. 26, 2016. The contents and subject matters of the Chinese priority application is incorporated herein by reference.

FIELD OF INVENTION

The present invention relates to food additives, particularly, a composition for improving the quality of meat products, method for producing a meat product containing the same, and the meat product made thereof.

BACKGROUND ART

Meat quality reflects comprehensive combination of physiochemical characteristics of fresh or processed meat, such as the appearance, tastiness, and nutrition, among which the tenderness and water retention directly affect the edible value and commercial value of meat products. Tenderness is the foremost physical index of the tastiness of the meat, and reflects the quality of the meat and the structural characteristics of the various proteins. Meat tenderness refers to, firstly, the impression when chewing of meat tissues, whether the meat is easily separable to biting of teeth, secondly, whether it is easily chewed to pieces, and thirdly, the quantity of the residue left in the mouth after chewing, which is often associated with softness, juiciness, and ease of chewing for cooked. It is of an immediate significance for the production of meat products and for the appraisal of the meat quality to determine meat tenderness and water retention. What runs counterpart to tenderness is the muscle toughness of the meat, which refers to continual resistance of the meat muscle when being chewed. The more aged the muscle, the more muscular the muscle fiber, the richer the fascia, the more the veins, the more difficult it is to chew. Water retention of the muscle is related to muscle tissues. Water retention refers to the capability of the meat to retain water of the meat per se or that added during meat processing, which is a comprehensive index of the capacity of the meat including that of the meat itself to preserve and retain water under various processing conditions, and is closely related to other meat quality indexes such as flavor, color, and tenderness.

The determination of muscle tenderness may be subjective or objective. A subjective method is via tasting by a human, while an objective one includes various physical and chemical methods by means of instrument analysis to determine the various indexes such as shearing, penetrating, biting, chopping, compressing, elastic, and tension forces, so as to determine the muscle tenderness. Currently, the most commonly employed index for determining muscle tenderness is shearing force. Generally, water preserving and retaining capacity is obtained via a centrifugal method by means of calculating water quantity changes in meat.

Phosphate is a conventional meat tenderizer used in the meat processing industry nowadays, and is the most widely used food additive worldwide due to its tenderizing and meat quality improving effects. However, the addition of excessive phosphate results in reduction of the meat quality and is detrimental to human health.

Therefore, it is extremely desirous to develop a composition for improving meat product quality by means of improvement in formulation and techniques. The composition shall not contain phosphorus element, and the tenderizing effect thereof shall still be effective in the process of repeated freezing and cooking.

SUMMARY OF INVENTION

The present invention provides a composition for improving the quality of the meat product, comprising 4-30 of an edible salt, 1-15 of a carbonate, 0.1-15 of an organic acid salt, 0.1-6 of a sugar alcohol, 0.1-8 of an isomaltulose or trehalose or a combination of both, and 0.01-8 of a chito-oligosaccharide composition, in weight parts.

In a preferred embodiment of the present invention, the carbonate is selected from or is a combination of a multiple of a potassium carbonate, a potassium bicarbonate, a sodium carbonate, and a sodium bicarbonate.

In a preferred embodiment of the present invention, the organic acid salt is selected from or is a combination of a multiple of a sodium tartrate, a sodium gluconate, a sodium citrate, a sodium lactate, a sodium malate, a sodium alginate, and a potassium malate.

In a preferred embodiment of the present invention, the sugar alcohol is selected from or is a combination of a multiple of a xylitol, a mannitol, the isomaltulose, a lactitol, a hydrogenated starch hydrolysate, an erythritol, a sorbitol, and a maltitol.

In a preferred embodiment of the present invention, the composition further comprises an acid ester.

In a preferred embodiment of the present invention, the acid ester is selected from or is a combination of a multiple of a sorbitan acid fatty ester, a glycerin acid fatty ester, a propylene glycol fatty acid ester, and a sucrose fatty acid ester.

In a preferred embodiment of the present invention, the chito-oligosaccharide composition is the chito-oligosaccharide alone or in a mixture with one or more of an oligoisomaltose, a maltotriose, a soybean oligosaccharide, a raffinose, a stachyose, a fructo-oligosaccharide, a maltooligosaccharide, an isomaltose oligosaccharide, an oligo-galactose, a mannan-oligosaccharide, and a xylo-oligosaccharide.

In a preferred embodiment of the present invention, the composition further comprises a cyclodextrin.

The present invention further provides a method for meat processing, comprising the steps of applying the composition on a meat product.

In a preferred embodiment of the present invention, the composition is applied on the meat product by means of spraying, injecting, pasting, soaking, mixing, rubbing, stirring, or smearing.

The third aspect of the present invention is to provide a meat product which contains the composition.

The above aspects of the present invention along with the characteristics and advantages thereof shall be comprehended further with the detailed enunciation provided hereunder.

DETAILED DESCRIPTION OF THE INVENTION AND EMBODIMENTS

The present invention is better comprehended as shown in the following embodiments. Unless otherwise indicated, the technical terms are interpreted as are understood by a person of the art. In case of a difference, the definitions in the present specification shall prevail.

The terms "is made of" and "comprises" employed by the present specification are synonyms to each other. The terms "comprise," "include," "have," and "contain" or other terms and their variations are meant to indicate a non-exclusive inclusion. For example, a composition, step, method, product, or device comprising the listed elements are not limited to said elements, but might comprise other elements which are not specifically indicated or those inherent to said composition, step, method, product, or device.

The term "consist of" excludes elements, steps, or components which are not indicated. When used in a claim, the term will make the claim to be closed-end, and exclude other materials which are not described therein, with the exception of normal impurities. When the term "consist of" appears in a clause of a claim sentence but is not directly subsequent to the subject, it will only be limited to the elements described in the clause; other elements in the claim are not excluded thereby.

Equivalent weight, concentration, or other values or parameters expressed with a range, a preferred range, or a range limited by a series of preferred upper bounds and preferred lower bounds, are to be understood as disclosing all the ranges formed by all the pairs between a preferred upper bound or a value and a preferred lower bound or value, regardless whether the specific ranges are separately disclosed or not. For example, when the range "1-5" is disclosed, it is to be understood as include the ranges "1-4," "1-3," "1-2," "1-2 and 4-5," and "1-3 and 5," etc. A numerical range as is described in the specification shall be understood as comprise the end points and all the integers and fractions in the range, unless otherwise indicated.

Singular forms refer to plural forms as well, unless otherwise specified clearly in the context. "Any" or "any of" indicates that the things or events subsequently described may or may not take place, and the description applies regardless the event takes place or not.

A term expressing an approximate quantity in the specification or claim indicates that the quantity is not limited to the specific number, but may also include other acceptable revised parts which are close to the quantity and without changing the related basic functions.

Correspondingly, "approximate" or "about" is used to modify a number means that the invention is not limited to the precise value. For some examples, a term expressing an approximate quantity corresponds to the precision of the device measuring the value. For the specification and claim of the present invention, range limitation may combine and/or interchange and the range include all the sub-ranges contained therein.

Further, an indefinite article "a" or "an" preceding an element or component of the present invention does not limit the number of the element or component (that is, the number of time of appearance). Therefore, "a" or "an" shall be construed as comprising one or more (of the elements or components) and the element or component in singular form refers to the plural form as well, unless the number obviously refers to singular form only.

For a substantiated comprehension of the present invention, certain aspects, modes, implementing means, variations, and characteristics of the present invent are described in various levels of details.

For implementation of the present invention, numerous traditional techniques from bio-chemistry, food chemistry, food processing engineering, food bio-chemistry, food microbiology, food molecular biology, food statistics, food additive science, muscle protein biochemistry, muscle molecular biology, and physiology are employed. These techniques are well known.

The technical terms as used in the present specification, unless otherwise indicated, conform to those as employed by a person of the art.

The first aspect of the present invention provides a composition for improving meat product quality, comprising at least 4-30 of an edible salt, 1-15 of a carbonate, 0.1-15 of an organic acid salt, 0.1-6 of a sugar alcohol, 0.1-8 of an isomaltulose and/or trehalose, and 0.01-8 of a chito-oligosaccharide composition, in weight parts.

Edible Salt:

The term "edible salt" refers to the salt as is generally employed in food industry, that is, the edible salt with a chemical formula of NaCl, as well as other salts for their specific purposes, for example, iodine salt. In addition, the edible salt of the present invention refers as well to other salty agents as are employed in food industry, such as the edible inorganic compositions of potassium chloride, ammonium chloride, sodium bromide, lithium bromide, sodium iodide, and lithium iodide with salty property, for purpose of example. The above salty agents may be employed in combination with the edible salt or independently. Hence, the edible salt of the present specification, unless otherwise indicated, refers to all the salty agents employed in food industry.

For the present invention, the edible salt is in 4-30 weight part, preferably weight parts at 10-25, more preferably weight parts at 15-20, and most preferably weight part of 18.

Carbonate:

The term "carbonate" of the present specification refers to a salt with a carbonate group (radical) of ions, for example, potassium salt, sodium salt, iron salt, or calcium salt. The present specification is not limited to any specific salt and one or multiple of the carbonate salts might be added to the meat product.

In a preferred embodiment of the present invention, the carbonate is selected from or is a combination of a multiple of a potassium carbonate, a potassium bicarbonate, a sodium carbonate, and a sodium bicarbonate.

For the present invention, the carbonate is in 1-15 weight part, preferably weight part of 3-13, more preferably weight part of 6-9, and most preferably weight part of 7.

Organic Acid Salt:

For the present invention, the organic acid salt is one or multiple selected from the group containing sodium salt and potassium salt of mono carboxylic acid, dicarboxylic acid, and polycarboxylic acid.

In the present invention, the organic acid salt is selected from or is a combination of a multiple of a sodium tartrate, a sodium gluconate, a sodium citrate, a sodium lactate, a sodium malate, a sodium alginate, and a potassium malate.

In the present invention, the organic acid salt is in 0.1-3 weight part, preferably weight part of 0.5-2.2, more preferably 1.1-1.8, and most preferably weight part of 1.6.

Sugar Alcohol:

The term "sugar alcohol" of the present specification refers to a polyhydric alcohol containing two or more than two hydroxyls produced from hydroxylation of aldehyde or keto carbonyl groups of a sugar.

In the present invention, the sugar alcohol is selected from or is a combination of a multiple of a xylitol, a mannitol, the isomaltulose, a lactitol, a hydrogenated starch hydrolysate, an erythritol, a sorbitol, and a maltitol.

In the present invention, the sugar alcohol is in 0.15-3 weight part, preferably at weight part of 0.5-2.8, more preferably weight part of 1.5-2.5, and most preferably weight part of 2.2.

Isomaltulose or Trehalose

In the present invention, the isomaltulose or trehalose is in weight part of 0.1 to 8.0, preferably at weight part of 0.15-5.

Chito-oligosaccharide and Chito-oligosaccharide Composition:

The term "chito-oligosaccharide" of the present specification is also named oligosaccharide, and is a low-molecular carbohydrate polymer produced from condensation of glycoside bonds of 3-9 monosaccharides.

In the present invention, the chito-oligosaccharide composition is the chito-oligosaccharide alone or in a mixture with one or more of an oligoisomaltose, a maltotriose, a soybean oligosaccharide, a raffinose, a stachyose, a fructo-oligosaccharide, a maltooligosaccharide, an isomaltose oligosaccharide, an oligo-galactose, a mannan-oligosaccharide, and a xylo-oligosaccharide.

In the present invention, the chito-oligosaccharide is in 0.01-5 weight part, with a preferred weight part of 0.5-2.8, a more preferred weight part of 1.5-2.5, and most preferred weight part of 2.2.

The carbonate and organic acid salt employed for the present invention may enhance water absorption, water retention and tenderness of a meat product. The present invention provides that, quite unexpectedly, with a chito-oligosaccharide added to the composition of the present invention, the meat product still retains it water retention and tenderness after repeated (two or more than two times) freezing or cooking. One possible explanation is that the added chito-oligosaccharide is able to preserve the precursors for the flavor of the meat product, the linoleic acid, linolic acid, creatine, and inosinic acid in the composition of the present invention, which otherwise would migrate out of the meat tissues, due to the biological compatibility and the positive ions of the chito-oligosaccharide, with the latter capable of migrating with the linoleic acid, linolic acid, creatine, and inosinic acid in the meat product, for realization of the purpose of the present invention.

Acid Ester:

In the present invention, the acid ester is selected from or is a combination of a multiple of a sorbitan fatty acid ester, a glycerin fatty acid ester, a propylene glycol fatty acid ester, and a sucrose fatty acid ester.

In a preferred embodiment of the present invention, the acid ester is in 0.01-1 weight part, and preferably, 0.5-0.8 weight part.

A small quantity of acid ester, being also a chance discovery of the present inventor, is able to cooperate with the chito-oligosaccharide of the present invention for enhancing water retention and tenderness of the meat product after repeated (two or more than two times) freezing or cooking, and thus for enhancing the beneficial effects of the present invention.

Cyclodextrin:

The cyclodextrin of the present invention is not limited in a particular manner, and may be either cyclodextrin per se, or a derivative thereof.

The cyclodextrin or a derivative thereof may be, but is not limited to, for example: cyclodextrin, such as α-cyclodextrin, β-cyclodextrin, or γ-cyclodextrin; cyclodextrin derivative, such as glucosyl cyclodextrin, 6-O-α-maltosyl-α-cyclodextrin, 6-O-α-D-glucosyl-α-cyclodextrin, glucuronyl glucosyl-β-cyclodextrin, 6-O-α-maltosyl-β-cyclodextrin, 6-O-α-D-glucosyl-β-cyclodextrin, or 6-O-α-D-maltosyl-β-cyclodextrin.

In a preferred embodiment of the present invention, the cyclodextrin is in 0.1-8 weight part, and preferably 1-5 weight part.

When fast freezing a meat product, the water content solidifies in a fast manner to form ice crystals which will drastically reduce the water retention, water absorption, and tenderness of the meat product. The present invention provides that, quite unexpectedly, the composition of the present invention added with cyclodextrin safeguards the water absorption, water retention and tenderness of the fast freezing meat product. The possible cause is that the cyclodextrin added to the meat product, due to its compatibility with meat tissues and slight solubility in water, may inhibit formation of ice crystals, thus enhancing water absorption, water retention, and tenderness for the fast freezing meat product.

Additional Additives:

The composition of the present invention may further comprise the following food additives: sugar, emulsifier, flavoring agent, eggs, non-salt inorganic composition or mineral, flour, milk protein, vegetable protein, edible liquid, edible gum, protein hydrolysate, non-sugar and non-sugar-alcohol carbohydrate, inorganic acid, alkali, condiment, alcohol, lipids, non-carbonate non-phosphorous inorganic salt, spice, acidity regulator, anti caking agent, defoamer, antioxidant, bleaching agent, leavening agent, color fixative, nutrition enhancer, preservative, thickener, colorant, or modifying agent.

The food additives may either be a natural material or chemically synthesized, with the requirement of conforming to international food additive manufacturing norms. Also, the food additives may either be synchronously added with the composition of the present invention, or be added prior or subsequent thereto.

The sugar as the food additive in the composition of the present invention may be, without being limited to, one or a combination of a multiple of white sugar, xylose, glucose, polydextrose, fructose, galactose, rhamnose, isomaltulose, sucrose, maltose, lactose, trehalose, fructo-oligosaccharide, isomaltose, maltooligosaccharide, isomaltose oligosaccharide, oligo-galactose (galacto-oligosaccharide), mannan-oligosaccharide, xylo-oligosaccharide, starch, cellulose, liver glycogen, muscle glycogen, proteoglymay, and honey.

The composition of the present invention may be fabricated, according to anyone's preference, in the form of granule, pill, powder, tablet, solution, effervescent tablet, dry powder, colloidal capsule, gel, emulsion, coated preparation, cream, ointment for external application, unguentum, external liquid preparation, dispersion liquid, or liquid spray, without any impact on the composition's effect on the meat product, that is, the meat product processed with the composition of the present invention is highly water absorbent and water retentive, with the tenderness and juice, as well as the flavor, of the meat product being perfectly preserved. Said composition may either be independently applied, or be fabricated in a mixture with other food additives for application.

The second aspect of the present invention is to provide a meat processing method comprising the steps of applying the composition of the present invention on a meat product. The composition comprises at least 4-30 of an edible salt, 1-15 of a carbonate, 0.1-15 of an organic acid salt, 0.1-6 of a sugar alcohol, 0.1-8 of an isomaltulose and/or trehalose, and 0.01-8 of a chito-oligosaccharide composition, in weight parts.

The carbonate is selected from or is a combination of a multiple of a potassium carbonate, a potassium bicarbonate, a sodium carbonate, and a sodium bicarbonate.

The organic acid salt is selected from or is a combination of a multiple of a sodium tartrate, a sodium gluconate, a sodium citrate, a sodium lactate, a sodium malate, a sodium alginate, and a potassium malate.

The sugar alcohol is selected from or is a combination of a multiple of a xylitol, a mannitol, the isomaltulose, a lactitol, a hydrogenated starch hydrolysate, an erythritol, a sorbitol, and a maltitol.

In a preferred embodiment of the present invention, the composition further comprises an acid ester.

The acid ester is selected from or is a combination of a multiple of a sorbitan fatty acid ester, a glycerin fatty acid ester, a propylene glycol fatty acid ester, and a sucrose fatty acid ester.

The chito-oligosaccharide composition is the chito-oligosaccharide alone or in a mixture with one or more of an oligoisomaltose, a maltotriose, a soybean oligosaccharide, a raffinose, a stachyose, a fructo-oligosaccharide, a maltooligosaccharide, an isomaltose oligosaccharide, an oligo-galactose, a mannan-oligosaccharide, and a xylo-oligosaccharide.

In a preferred embodiment of the present invention, the composition further comprises a cyclodextrin.

The composition of the present invention in the afore-mentioned description is applied on a meat product by means of spraying, injecting, pasting, soaking, mixing, rubbing, stirring, or smearing. For the above various manners of application, the various components of the composition of the present invention are synchronously or sequentially added in a step, or respectively added in various steps, in the process of cryogenic storage and/or cooking.

The term "cryogenic storage" refers to either one of "cold storage" or "freezing storage".

In the present invention, the "cold storage" refers to storage in the temperature of 0-15° C., while "freezing storage" refers to storage in the temperature of −180-0° C.

In an embodiment of the present invention, the meat product is put in storage with the composition together for 10 minutes to 50 hours, suitably incubated together for 3-36 hours, preferably incubated together for 5-24 hours.

In another embodiment of the present invention, the cold storage is implemented below approximately the temperature of 15° C. with the meat product and the composition being incubated together, for example in the temperature range of 0-13° C., suitably in the range of 1-11° C., and preferably in the range of 2-6° C.

The afore-mentioned meat product and the composition may be incubated together below approximately the temperature of 15° C., for example in the temperature range of 0-13° C., suitably in the range of 1-11° C., and preferably in the range of 2-6° C., for 1-48 hours.

In an embodiment of the present invention, the afore-mentioned meat product and the composition put in freezing storage together for 0.5-60 days, preferably for 1-30 days, and more preferably for 1-7 days.

In another embodiment of the present invention, the afore-mentioned meat product and the composition put in freezing storage together down to an approximate temperature of −180° C. (for example in liquid nitrogen), for example in the temperature range of 0° C. to −180° C., suitably in the range of −20° C. to −60° C., more suitably in the range of −10° C. to −50° C., and preferably in the range of −20° C. to −40° C.

In another embodiment of the present invention, the afore-mentioned meat product and the composition put in freezing storage together down to an approximate temperature of −180° C. (for example in liquid nitrogen), for example in the temperature range of 0° C. to −180° C., suitably in the range of −20° C. to −60° C., more suitably in the range of −10° C. to −50° C., and preferably in the range of −20° C. to −40° C., for 1-7 days.

The third aspect of the present invention is to provide a meat product which contains the composition of the present invention.

The composition of the present invention comprises at least 4-30 of an edible salt, 1-15 of a carbonate, 0.1-15 of an organic acid salt, 0.1-6 of a sugar alcohol, 0.1-8 of an isomaltulose and/or trehalose, and 0.01-8 of a chito-oligosaccharide, in weight parts.

The carbonate is selected from or is a combination of a multiple of a potassium carbonate, a potassium bicarbonate, a sodium carbonate, and a sodium bicarbonate.

The organic acid salt is selected from or is a combination of a multiple of a sodium tartrate, a sodium gluconate, a sodium citrate, a sodium lactate, a sodium malate, a sodium alginate, and a potassium malate.

The sugar alcohol is selected from or is a combination of a multiple of a xylitol, a mannitol, the isomaltulose, a lactitol, a hydrogenated starch hydrolysate, an erythritol, a sorbitol, and a maltitol.

In a preferred embodiment of the present invention, the composition further comprises an acid ester.

The acid ester is selected from or is a combination of a multiple of a sorbitan fatty acid ester, a glycerin fatty acid ester, a propylene glycol fatty acid ester, and a sucrose fatty acid ester.

The chito-oligosaccharide composition is the chito-oligosaccharide alone or mixed with one or more of an oligoisomaltose, a maltotriose, a soybean oligosaccharide, a raffinose, a stachyose, a fructo-oligosaccharide, a maltooligosaccharide, an isomaltose oligosaccharide, an oligo-galactose, a mannan-oligosaccharide, and a xylo-oligosaccharide.

In a preferred embodiment of the present invention, the composition further comprises a cyclodextrin.

The term "meat" in the present invention in a narrow sense refers to all the edible meat or organs which contain muscle fiber tissues existing in an animal in nature. The term "meat" in the present specification in a broad sense further comprises all the edible meat and organs from an animal, such as: heart, liver, kidney, small intestine, large bowel or ileocecum, stomach, brain, tongue, or ear. The term "meat" in the present specification refers both to the "meat" in the narrow and broad sense.

The meat as used in the present invention may come from any kind of animal, which may be divided into cattle, poultry, aquatic invertebrate, and mollusca. The cattle in the present invention may be terrestrial, amphibian, or reptile animals, such as a cow, buffalo, bison, pig, wild boar, sheep (for example a lamb, ewe, or goat), donkey, deer, camel, mouse, and horse; the poultry meat includes meat from land roaming ones and flying birds, such as chicken, pheasant, turkey, ostrich, duck, and goose and so on; fish may be fresh water, marine, migratory, or semi-migratory, such as a carp, silvery carp, grass carp, black carp, snakehead, cod, herring, tuna, sardine, mackerel, horse mackerel, Chinese sturgeon, saury, flatfish, whitebait, anchovy, bream, trout, catfish, perch, capelin, sea bream, salmon, huso, and yellow croaker; aquatic invertebrate or mollusca may be shrimp, squid, abalone, clam, scallop, cockle, periwinkle, snail, oyster, sea cucumber, octopus, or a combination thereof.

The term "meat" also comprises a meat product fabricated in any forms by means of grinding, rubbing, stirring, mixing, shredding or other known methods in prior art, for example, meat emulsion or minced meat in a loosely structured or round form, or cutlet, shredded meat, sliced meat, meat cut, or meat stick, and may be raw meat prior to cooking, or cooked or processed meat, including instant meat and/or cooked meat.

In certain embodiments, the composition of the present invention is applicable particularly for beef, pork, chicken, lamb, and fish.

The term "meat product" and "meat sample" both refer to "meat-containing food," with the three terms being interchangeable in certain cases, and being in any of the following forms: (1) dry or half dry bacon, such as fermented product dry-cured and fermented with a starter culture, for example bacon or dry ham; (2) emulsified meat product (as cold food or served hot), such as smocked sausage, caviar, luncheon meat, meat paste, or ground meat; (3) fish or seafood, such as shrimp, salmon, assorted fish, fish cake, fish ball, or deep frozen fish; (4) poultry, such as chicken breast, turkey breast, or assorted poultry, for example, chicken nuggets, chicken sausage, or a combination thereof; (5) pasteurized product, such as meat product pasteurized in high temperature, for example, picnic ham, luncheon meat, or an emulsified product. A meat dish preparation applicable with the composition of the present invention includes, but is not limited to, fried shredded pork, braised pork slice, barbecue string, roasted tendon, roasted kidney, roasted chicken gizzard, sizzling meat, grilled steak, fritters, roast beef, roast chicken, curry pork, peanut chicken, pork stew, fried pork nuggets, stewed pork cuts, steamed fish, fish roe, hot pot pork fillet, tripe, tripe slice, sweet and sour meat, or a combination thereof; a meat product employing ground meat and utilizing the composition of the present invention include a hamburger, Kentucky hamburger, hot dog, dumpling, steamed and stuffed bun, meat ball, steamed pork dumpling, dumpling soup, rissole, fried spring roll, or a combination thereof. The term "meat product" refers to any meat based product and suitable for human, animal consumption, or both as food or fodder. The meat product may comprise non-meat ingredients, such as vegetable protein, water, salt, flour, butter, monosodium glutamate, milk protein, starch, protein hydrolysate, acid, vinegar, cooking wine, condiment, emulsifier, colorant, modifying agent, or a combination thereof; the meat product may be for instant consumption in certain cases, and in other cases is a product stored at low temperature, in the process of being cooked, or both. In a word, it refers to any meat-containing product in any circumstance and in any forms.

The meat product of the present invention is obtainable by means of any known cooking method which include, for purpose of exemplification, but is not limited to: steaming, boiling, sautéing, stir-frying, deep-frying, grilling, roasting and baking, which are instantly applicable to home cooking, catering industry, or food industry once fully known to a person of the art. Hence, the method for improving meat quality of the present invention is applicable and effective for cooking as well. Though the realization of such an effect is not related to the employed cooking method per se, the tenderness and juiciness of the meat is well preserved, with perfect presentation of flavor and thus a prominent effect, when a sautéing, stir-frying, deep-frying, grilling, roasting, or baking method is adopted.

The composition of the present invention constitutes a content of 1-30% of the meat product of the present invention, for example, 3%, 5%, 7%, 9%, 11%, 13%, 15%, 21%, 28%, or 29%.

In another embodiment of the present invention, the "meat" may be one kind of meat, or a mixture with two kinds of meat, and may be, for purpose of exemplification, but is not limited to a mixture of pork and beef, or a mixture of fish, pork, and beef. The meat product processed with the composition of the present invention is highly water absorbent and retentive, while at the mean time preserves the tenderness, juice of the meat, and a perfect flavor. *

In certain embodiments, the meat product may be cooked meat, for example, ham, smoked or grilled meat of tenderloins, forelegs, pork fillet, intestines, and organs.

The present invention is fully explained by specific examples hereunder provided, which is not meant to limit the scope of the invention. A person of the art shall be able to make non-substantive modifications and adjustments to the present specification, which shall fall within the scope of protection of the present invention.

Further, unless otherwise specified, the ingredients employed are all for sale in the market.

EXAMPLES

The ingredients used in the examples are represented by the following abbreviations:

A1: pure water; B1: edible salt;

Carbonate: C1: potassium carbonate; C2: sodium carbonate; C3: sodium carbonate; C4: sodium carbonate/potassium carbonate (in a mass ratio of 1:1).

Organic Acid Salt: D1: sodium tartrate; D2: odium gluconate; D3: sodium citrate; D4: sodium citrate—sodium gluconate—sodium lactate (in a mass ratio of 1:1:1).

Sugar Alcohol: E1: maltitol; E2: xylitol, mannitol, isomaltulose, lactitol, hydrogenated starch hydrolysate, erythritol; E3: sorbitol; E4: maltitol—xylitol, mannitol, isomaltulose, lactitol, hydrogenated starch hydrolysate, erythritol—sorbitol (in a mass ratio of 1:1:1).

F1: isomaltulose; G1: trehalose.

Chito-oligosaccharide Composition: H1: chito-oligosaccharide; H2: chito-oligosaccharide and oligoisomaltose; H3: chito-oligosaccharide, maltotriose; H4: chito-oligosaccharide—soybean oligosaccharide—oligoisomaltose—raffinose.

Acid Ester: I1: sorbitan fatty acid ester; G1: glucosyl cyclodextrin.

Examples 1-9

Comprehensive Evaluation of the Composition of the Present Invention on Improvement of Quality of a Chicken Product Weigh the edible salt, carbonate, organic acid salt, sugar alcohol, isomaltulose, trehalose, or both isomaltulose and trehalose, chito-oligosaccharide, acid ester, and cyclodextrin, according to the weight parts as are listed on Table 1, dissolve in 1.0 L of water, and fabricate as a liquid composition of the present invention. The composition is prepared as follows:

(1) Weigh chicken breast 1 kg, then cut, shred, or slice;
(2) Weigh the ingredients of the composition according to Table 1, and dissolve into 1.0 L of water;
(3) Put the meat in (1) into the liquid composition in (2), and store at 10° C. for 24 hours;

(4) Remove water by centrifugation, weigh again, and calculate water absorption;

(5) Allocate 500 g of the meat for freezing assay, that is, freeze in a refrigerator under −40° C. for two days, and measure shear force and cooking loss rate;

Defrost 250 g of the frozen meat and conduct a refreezing assay under −40° C. for 3 days, and measure shear force and cooking loss rate.

Measurement of Shearing Force:

measure the shearing force of the cooked meat sample with a SMS (Stable Micro Systems) texture analyzer. That is, cut the meat sample into 75 mm×10 mm×10 mm slices, process according to the related embodiments, and put the processed meat into a cauldron with 85° C. constant temperature, cook until the temperature at the center reaches 72° C. . Then cool to room temperature, and measure the

TABLE 1

| | | Ingredients | | | | | | | | |
|---|---|---|---|---|---|---|---|---|---|---|
| | | Example | | | | | | | | |
| | | 1 | 2 | 3 | 4 | 5 | 6 | 7 | 8 | 9 |
| Edible salt | B1 | 4 | 6 | 10 | 15 | 18 | 23 | 25 | 28 | 30 |
| carbonate | C1 | 1 | | | | | | 13 | | |
| | C2 | | 3 | | | | 11 | | 15 | |
| | C3 | | | 6 | | | | | | |
| | C4 | | | | 9 | 7 | | | | 7 |
| Organic acid salt | D1 | 0.1 | | | | | | 2.2 | | |
| | D2 | | 0.3 | | | | 1.8 | | 3 | |
| | D3 | | | 0.7 | | | | | | 1.6 |
| | D4 | | | | 1.1 | 1.6 | | | | |
| Sugar alcohol | E1 | 0.15 | | | | | | 2.5 | | |
| | E2 | | 0.5 | | | | 2.2 | | 2.8 | |
| | E3 | | | 1 | 1.5 | | | | | 3 |
| | E4 | | | | | 2 | | | | |
| isomaltulose | F1 | 0.15 | | 0.5 | 1 | 2 | 3 | | 4.5 | |
| trehalose | G1 | | 0.3 | 0.5 | | 1 | | 4 | | 5 |
| chito-oligosaccharide | H1 | 0.01 | | | | | | 3 | | |
| | H2 | | 0.1 | | | | 2.5 | | 4 | |
| | H3 | | | 1 | | | | | | 5 |
| | H4 | 1 | | | 1.5 | 2 | | | | |
| Acid ester | I1 | | 0.01 | | 1 | 1 | 0.5 | 0.6 | 0.8 | 0.9 |
| cyclodextrin | G1 | | | 0.1 | 1 | 5 | 8 | 2 | 3 | 4 |

Control preparation 1 (cp1): 18 g of edible salt;
Control preparation 2 (cp2): 18 g edible salt, 2 g papain, and 5 g glucose;
Control preparation 3 (cp3): 18 g edible salt, and 15 g sodium tripolyphosphate;

(6) water absorption measurement: employ the general method of the art, that is, apply the composition of the present invention, and remove water by means of centrifugation with a Beckman low temperature refrigerated centrifuge at 4° C., with a centrifugal force of 10000 g), and weigh.

Water absorption rate=(weight of the meat sample subsequent to application of the composition−weight of the meat sample prior to application)/weight of the meat sample prior to application× 100%.

Water Retention Measurement:

cut, shred, mince, or slice, 100 g of meat sample, then apply the composition of the present invention according to the method of the present invention to the meat sample. Next follow the general method of the art, put the meat sample directly or subsequent to freezing onto a cooking bag, then put the cooking bag into a cauldron with 85° C. water to cook until the temperature at the center reaches 72° C. Then pull out to cool to room temperature, remove water by means of centrifugation, weigh, and calculate cooking loss rate with the following formula.

Cooking loss rate=(weight of the meat sample prior to cooking−weight of the meat sample subsequent to cooking)/weight of the meat sample prior to cooking×100% shearing force (that is, shearing stress) values with the texture analyzer. The smaller the shearing force value, the more tender it indicates the meat to be. The meat sample for the shearing force assay may also be any meat product cooked or processed with any other method, such as steamed, cooked, fried meat, ham, or smoked or grilled meat, etc.

Suitably, the above measurement assay on water absorption, water retention, and shearing force shall be repeated for three times, preferably repeated for four times.

Shearing force decrease rate is calculated with the following formula:

(shearing force of the processed meat samples−shearing force of the un-processed meat samples)/shearing force of the un-processed meat samples×100%

The assay method conforms to certified standards of various international authoritative institutions, such as AACC (American Association of Cereal Chemists), AIB (American Institute of Baking), AOAC (Association of Analytical Chemists), BS (British Standards), ISO (International Organization for Standardization), ASTM (American Standard Test Method), GMIA (Gelatin Manufacturers Institute of America), and AFERA (European Association for the Self Adhesive Tape Industry).

TABLE 2

Chicken Quality Assay

| Process | | 1 | 2 | 3 | 4 | 5 | 6 | 7 | 8 | 9 | Cp1 | Cp2 | Cp3 |
|---|---|---|---|---|---|---|---|---|---|---|---|---|---|
| Cold storage | Water absorption | 23% | 29% | 36% | 40% | 55% | 31% | 21% | 18% | 15% | 5% | 12% | 13% |
| | Cooking loss rate | 13% | 12% | 9.9% | 6.5% | 4.5% | 7.4% | 8.9% | 11% | 12% | 26% | 15% | 16% |
| | Shearing force (kg) | 4.2 | 3.9 | 3.4 | 3.2 | 2.1 | 2.9 | 3.9 | 4.3 | 5.1 | 7.6 | 6.7 | 6.5 |
| freezing once | Freezing water loss rate | 12% | 11% | 9.8% | 6.1% | 4.9% | 7.7% | 8.7% | 10.2% | 11.9% | 15% | 10% | 12% |
| | Cooking loss rate | 14.8% | 14.1% | 13% | 7.3% | 6.2% | 8.2% | 10.5% | 11.4% | 13.3% | 30% | 20% | 18% |
| | Shearing force (kg) | 4.4 | 3.9 | 3.5 | 3.3 | 2.5 | 3.5 | 4.1 | 4.5 | 5.2 | 7.8 | 6.9 | 6.9 |
| Freezing twice | Freezing water loss rate | 16% | 15% | 14% | 7.0% | 5.3% | 9.5% | 12.6% | 14.6% | 14.1% | 25% | 18% | 19% |
| | Cooking loss rate | 16% | 15% | 14% | 8.1% | 6.5% | 10.4% | 12.4% | 13% | 15.1% | 50% | 38% | 40% |
| | Shearing force (kg) | 4.9 | 4.5 | 4.2 | 4.0 | 2.7 | 3.9 | 4.5 | 4.9 | 5.5 | 8.9 | 7.1 | 6.9 |

(7) Sensory Evaluation: respectively fry the meat products of examples 1-9, and the control preparations 1-3, and then conduct sensory evaluation on them.

Put 20-30 ml of soybean oil in a frying pan, preheat. The fry the meat slices 250 g each from the examples 1-9 and control preparations 1-3, and add 3 g of pepper powder.

A group of 30 persons is set up to confer sensory evaluation on each of the samples. Sensory evaluations include visual and tasting evaluations on the fried meat. Visual appraisals include color and appearance observations of the meat dishes, such as whether the grains are fine or rough, whether the appearance is bright or lack luster (for example pale), wholeness of the meat slice, whether the meat is plump (does it swell), bright and transparent, elastic at touch of a finger, with four overall evaluations, "very satisfactory," "satisfactory," "no opinion," and "unsatisfactory." Tasting assays confer evaluations on "tenderness" and "juiciness" of the meat product, and are given as "very tender," or "very juicy"; "relatively tender" or "relatively juicy"; "not tender" or "slaggy." The results are shown on Table 3.

TABLE 3

Evaluation on Chicken Quality

| Evaluation | 1 | 2 | 3 | 4 | 5 | 6 | 7 | 8 | 9 | Cp1 | Cp2 | Cp3 |
|---|---|---|---|---|---|---|---|---|---|---|---|---|
| Very satisfactory | 14 | 16 | 15 | 19 | 24 | 18 | 16 | 15 | 14 | 0 | 5 | 0 |
| satisfactory | 7 | 8 | 8 | 5 | 5 | 5 | 7 | 7 | 6 | 0 | 7 | 2 |
| Neutral | 7 | 5 | 5 | 3 | 1 | 5 | 4 | 5 | 5 | 0 | 8 | 2 |
| unsatisfactory | 2 | 1 | 2 | 3 | 0 | 2 | 3 | 3 | 5 | 30 | 10 | 26 |
| Very juicy | 16 | 15 | 19 | 20 | 22 | 19 | 17 | 17 | 15 | 0 | 2 | 0 |
| Relatively juicy | 9 | 12 | 9 | 8 | 8 | 9 | 10 | 10 | 11 | 0 | 16 | 7 |
| Not juicy | 5 | 3 | 2 | 2 | 0 | 2 | 3 | 3 | 4 | 30 | 12 | 23 |
| Very tender | 14 | 12 | 15 | 19 | 25 | 18 | 19 | 16 | 15 | 0 | 4 | 0 |
| Relatively tender | 10 | 13 | 10 | 8 | 5 | 10 | 8 | 9 | 7 | 0 | 15 | 5 |
| slaggy | 6 | 5 | 5 | 3 | 0 | 2 | 3 | 5 | 8 | 30 | 11 | 25 |

It may be seen from Tables 2 and 3 that the chicken meat, after being applied with the composition of the present invention, is still comparatively water absorbent and has relatively low cooking loss rate and freezing water loss rate after cold storage and repeated freezing. The chicken meat does not leak liquid at defrosting, and has relatively low cooking loss rate and freezing water loss rate.

Take the meat product of Example 5, store at 4° C. for one day. It is still tender and juicy subsequent to repeated cooking and heating.

The composition applies as well to processing of other meats in the present invention, such as pork, fish, mutton, and chicken and fish. Similar results are obtained on the additive of the present invention in other assays.

Examples 10-18

Comprehensive Evaluation Experiment of the Composition of the Present Invention on Improvement of Quality of a Pork Product Weigh the edible salt, carbonate, organic acid salt, sugar alcohol, isomaltulose and/or trehalose, chito-oligosaccharide composition, acid ester, and cyclodextrin, according to the weight parts as are listed on Table 1, dissolve in 1.0L of water, and fabricate as a liquid composition of the present invention. Examples 10-18 respectively correspond to Examples 1-9.

Control preparation 4 (Cp4): 18 g of edible salt; Control preparation 5 (Cp5): 18 g edible salt, 2 g papain, and 5 g glucose; Control preparation 6 (Cp6): 18 g edible salt, and 15 g sodium tripolyphosphate;

(1) Weigh pork 1 kg, then cut, shred, or slice;
(2) Weigh the ingredients of the composition according to Table 1, and dissolve into 1.0 L of water;
(3) Put the meat in (1) into the liquid composition in (2), and store at 4° C. for 24 hours;
(4) Remove water by centrifugation, weigh again, and calculate water absorption;
(5) Allocate 500 g of the meat for freezing assay, that is, freeze in a refrigerator under −40° C. for two days, and measure shear force and cooking loss rate;

Defrost 250 g of the frozen meat and conduct a refreezing assay under −40° C. for 5 days, and measure shear force and cooking loss rate.

The above results are summarized on Table 4. Apparently, the physiochemical indexes show that the present invention increases meat water absorption, tenderness and water retention of the meat product.

Put 20-30 ml of soybean oil to grease the stainless net, and kindle the carbon. Then grill the meat slices 300 g each from Examples 10-18 and control preparations 4-6, and add 2 g of pepper powder.

A group of 30 persons is set up to confer sensory evaluation on each of the samples. Sensory evaluations include visual and tasting evaluations on the grilled meat. Visual appraisals include color and appearance observations of the meat dishes, such as whether the grains are fine or rough, whether the appearance is bright or lack luster (for example, pale), wholeness of the meat slice, whether the meat is plump (does it swell), bright and transparent, elastic at touch of a finger, with four overall evaluations, "very satisfactory," "satisfactory," "no opinion," and "unsatisfactory". Tasting assays confer evaluations on "tenderness" and "juiciness" of the meat product, and are given as "very tender" or "very juicy"; "relatively tender" or "relatively juicy"; "not tender" or "slaggy". The results are shown on Table 5.

TABLE 4

Pork Quality Assay

| Processing | | Example | | | | | | | | | | | |
|---|---|---|---|---|---|---|---|---|---|---|---|---|---|
| | | 10 | 11 | 12 | 13 | 14 | 15 | 16 | 17 | 18 | Cp4 | Cp5 | Cp6 |
| Cold storage | Water absorption | 45% | 48% | 50% | 52% | 58% | 51% | 48% | 43% | 41% | 5% | 12% | 14% |
| | Cooking loss rate | 6.7% | 6.1% | 5.7% | 5.1% | 4.5% | 6.0% | 6.2% | 6.8% | 7.1% | 26% | 17% | 18% |
| | Shearing force (kg) | 4.2 | 3.6 | 3.3 | 2.8 | 2.2 | 3.1 | 3.6 | 4.2 | 4.7 | 8.1 | 6.9 | 6.9 |
| Freezing once | Freezing water loss rate | 7.5% | 6.7% | 6.0% | 5.5% | 4.8% | 6.2% | 6.5% | 7.2% | 7.6% | 20% | 12% | 14% |
| | Cooking loss rate | 7.5% | 7.1% | 6.8% | 5.7% | 5.4% | 6.6% | 7.2% | 8.5% | 8.8% | 35% | 24% | 20% |
| | Shearing force (kg) | 4.5 | 3.9 | 3.5 | 3.1 | 2.4 | 3.3 | 3.9 | 4.5 | 4.9 | 8.5 | 7.9 | 7.4 |
| Freezing twice | Freezing water loss rate | 7.9% | 7.2% | 6.5% | 5.9% | 5.5% | 6.6% | 7.0% | 7.6% | 8.0% | 30% | 18% | 19% |
| | Cooking loss rate | 7.8% | 7.3% | 7.1% | 6.4% | 6.5% | 7.2% | 7.5% | 8.8% | 9.0% | 55% | 38% | 37% |
| | Shearing force (kg) | 5.1 | 4.3 | 3.8 | 3.3 | 2.6 | 3.6 | 4.3 | 4.8 | 5.1 | 9.5 | 7.2 | 7.0 |

Respectively grill the meat products of Examples 10-18, and the control preparations 4-6, and then conduct sensory evaluation on them.

TABLE 5

Evaluation on Pork Quality

| Evaluation | 10 | 11 | 12 | 13 | 14 | 15 | 16 | 17 | 18 | Cp4 | Cp5 | Cp6 |
|---|---|---|---|---|---|---|---|---|---|---|---|---|
| Very satisfactory | 19 | 20 | 22 | 22 | 24 | 18 | 17 | 14 | 12 | 0 | 0 | 0 |
| satisfactory | 5 | 5 | 5 | 4 | 6 | 9 | 8 | 11 | 11 | 0 | 5 | 2 |
| neutral | 3 | 4 | 1 | 2 | 0 | 2 | 3 | 3 | 4 | 0 | 6 | 8 |
| unsatisfactory | 3 | 1 | 2 | 2 | 0 | 1 | 2 | 2 | 3 | 30 | 19 | 20 |
| Very juicy | 19 | 20 | 21 | 21 | 24 | 23 | 21 | 20 | 17 | 0 | 1 | 1 |
| Relatively juicy | 8 | 8 | 7 | 8 | 6 | 6 | 7 | 8 | 11 | 0 | 7 | 7 |
| Not juicy | 3 | 2 | 2 | 1 | 0 | 1 | 2 | 2 | 2 | 30 | 22 | 22 |

TABLE 5-continued

Evaluation on Pork Quality

| Evaluation | 10 | 11 | 12 | 13 | 14 | 15 | 16 | 17 | 18 | Cp4 | Cp5 | Cp6 |
|---|---|---|---|---|---|---|---|---|---|---|---|---|
| Very tender | 20 | 21 | 22 | 22 | 25 | 23 | 22 | 19 | 19 | 0 | 0 | 0 |
| Relatively tender | 7 | 7 | 6 | 6 | 5 | 6 | 6 | 8 | 7 | 0 | 6 | 5 |
| slaggy | 3 | 2 | 2 | 2 | 0 | 1 | 2 | 3 | 4 | 30 | 24 | 25 |

It may be seen from Tables 4 and 5 that the pork meat, after being applied with the composition of the present invention, is still comparatively water absorbent and has relatively low cooking loss rate and freezing water loss rate after cold storage and repeated freezing. The pork meat does not leak liquid at defrosting, and has relatively low cooking loss rate and freezing water loss rate.

Take the meat product of Example 15, store at 4° C. for one day. It is still tender and juicy subsequent to repeated cooking and heating.

The composition applies as well to processing of other meats in the present invention, such as beef, mutton, and chicken and fish. Similar results are obtained on the additive of the present invention in other assays.

Examples 19-27

Comprehensive Evaluation Experiment of the Composition of the Present Invention on Improvement of Quality of a Beef Product Weigh the edible salt, carbonate, organic acid salt, sugar alcohol, isomaltulose and/or trehalose, chito-oligosaccharide composition, acid ester, and cyclodextrin, according to the weight parts as are listed on Table 1, dissolve in 1.0 L of water, and fabricate as a liquid composition of the present invention. Examples 10-18 respectively correspond to examples 1-9.

Control preparation 7 (Cp7): 18 g of edible salt; Control preparation 8 (Cp8): 18 g edible salt, 2 g papain, and 5 g glucose; Control preparation 9 (Cp9): 18 g edible salt and 15 g sodium tripolyphosphate;

(1) Weigh beef tenderloin 1 kg, then cut, shred, or slice;

(2) Weigh the ingredients of the composition according to Table 1, and dissolve into 1.0 L of water;

(3) Put the meat in (1) into the liquid composition in (2), and store at 10° C. for 24 hours;

(4) Remove water by centrifugation, weigh again, and calculate water absorption;

(5) Allocate 500 g of the meat for freezing assay, that is, freeze in a refrigerator under −40° C. for two days, and measure shear force and cooking loss rate;

Defrost 250 g of the frozen meat and conduct a refreezing assay under −40° C. for 7 days, and measure shear force and cooking loss rate.

The above results are summarized on Table 6. Apparently, the physiochemical indexes show that the present invention increases meat water absorption, tenderness and water retention of the meat product.

TABLE 6

Beef Quality Assay

| process | | 19 | 20 | 21 | 22 | 23 | 24 | 25 | 26 | 27 | Cp7 | Cp8 | Cp9 |
|---|---|---|---|---|---|---|---|---|---|---|---|---|---|
| Cold storage | Water absorption | 44% | 49% | 50% | 55% | 63% | 51% | 48% | 44% | 40% | 5% | 12% | 14% |
| | Cooking loss rate | 8.1% | 7.9% | 6.2% | 5.4% | 4.8% | 6.0% | 7.6% | 8.1% | 8.6% | 25% | 16% | 16.5% |
| | Shearing force (kg) | 4.0 | 3.5 | 3.1 | 2.2 | 1.9 | 2.9 | 3.2 | 3.9 | 4.6 | 7.9 | 6.9 | 6.8 |
| Freezing once | Freezing water loss rate | 7.3% | 6.4% | 5.9% | 5.3% | 4.5% | 6.0% | 6.3% | 7.0% | 7.5% | 18% | 11% | 13% |
| | Cooking loss rate | 8.5% | 8.1% | 6.9% | 5.5% | 5.9% | 6.2% | 7.9% | 8.4% | 8.9% | 32% | 22% | 19% |
| | Shearing force (kg) | 4.3 | 3.7 | 3.1 | 2.7 | 2.1 | 3.2 | 3.5 | 4.2 | 4.8 | 8.2 | 7.5 | 7.1 |
| Freezing twice | Freezing water loss rate | 7.8% | 6.8% | 6.4% | 5.9% | 5.1% | 6.5% | 8.1% | 8.7% | 9.2% | 27% | 17% | 16% |
| | Cooking loss rate | 8.9% | 8.5% | 7.4% | 6.6% | 6.3% | 6.8% | 8.1% | 8.6% | 9.2% | 53% | 34% | 31% |
| | Shearing force (kg) | 4.9 | 4.1 | 3.6 | 3.0 | 2.3 | 3.5 | 4.1 | 4.5 | 5.1 | 9.0 | 7.4 | 6.8 |

Respectively fry the meat products of Examples 19-27, and the control preparations 7-9, and then conduct sensory evaluation on them.

Put 20-30 ml of soybean oil in a frying pan, preheat. Then fry the meat slices 250 g each from the examples 18-27 and control preparations 7-9, and add 3 g of pepper powder. The above sensory evaluation results are summarized on Table 7.

A group of 30 persons is set up to confer sensory evaluation on each of the samples. Sensory evaluations include visual and tasting evaluations on the fried meat. Visual appraisals include color and appearance observations of the meat dishes, such as whether the grains are fine or rough, whether the appearance is bright or lack luster (for example pale), wholeness of the meat slice, whether the meat is plump (does it swell), bright and transparent, elastic at touch of a finger, with four overall evaluations, "very satisfactory," "satisfactory," "no opinion," and "unsatisfactory." Tasting assays confer evaluations on "tenderness" and "juiciness" of the meat product, and are given as "very tender" or "very juicy"; "relatively tender" or "relatively juicy"; "not tender" or "slaggy." The results are shown on Table 7.

TABLE 7

Evaluation on Beef Quality.

| Evaluation | 19 | 20 | 21 | 22 | 23 | 24 | 25 | 26 | 27 | Cp7 | Cp8 | Cp9 |
|---|---|---|---|---|---|---|---|---|---|---|---|---|
| Very satisfactory | 13 | 15 | 15 | 18 | 22 | 18 | 17 | 14 | 12 | 0 | 0 | 0 |
| satisfactory | 11 | 11 | 10 | 8 | 8 | 8 | 7 | 10 | 12 | 0 | 7 | 3 |
| neutral | 2 | 3 | 4 | 2 | 0 | 3 | 4 | 4 | 3 | 0 | 8 | 7 |
| unsatisfactory | 4 | 1 | 1 | 2 | 0 | 1 | 2 | 2 | 3 | 30 | 15 | 20 |
| Very juicy | 17 | 19 | 20 | 21 | 25 | 22 | 20 | 19 | 16 | 0 | 1 | 0 |
| Relatively juicy | 10 | 9 | 8 | 8 | 5 | 7 | 8 | 9 | 11 | 0 | 9 | 9 |
| Not juicy | 3 | 2 | 2 | 1 | 0 | 1 | 2 | 2 | 3 | 30 | 20 | 21 |
| Very tender | 18 | 20 | 21 | 23 | 26 | 24 | 23 | 21 | 19 | 0 | 0 | 0 |
| Relatively tender | 8 | 7 | 6 | 5 | 4 | 5 | 4 | 5 | 6 | 0 | 7 | 5 |
| slaggy | 4 | 3 | 3 | 2 | 0 | 1 | 3 | 4 | 5 | 30 | 23 | 25 |

It may be seen from Tables 6 and 7 that the beef meat, after being applied with the composition of the present invention, is still comparatively water absorbent and has relatively low cooking loss rate and freezing water loss rate after cold storage and repeated freezing. The beef meat does not leak liquid at defrosting, and has relatively low cooking loss rate and freezing water loss rate.

Take the meat product of Example 23, store at 4° C. for one day. It is still tender and juicy subsequent to repeated cooking and heating.

To conclude, the meat product added with the composition of the present invention, in comparison with a product of prior art, is characteristic of high water retentive with little cooking loss, being tender, elastic, and juicy, in addition to having relatively low freezing water loss rate and cooking loss rate, and being juicy, subsequent to repeated freezing and heating. At the mean time, the composition of the present invention is easily dissolvable and easy to blend, and is suitable for home, restaurant, and food industry in overcoming the difficulty of improving meat quality.

The present invention is not limited to the described embodiments and examples and various separate aspects thereof. A person of the art shall understand that the present invention is subject to modifications and alterations without departure from the spirit and scope thereof, whose usage and function being apparent to a person of the art within the disclosure of the present invention, which shall within the scope of the accompanying claims. The present disclosure is only limited by the accompanying claims and the entire scopes equivalent to the claims. It is further understood that the present disclosure is not limited to the specific methods, reagents, compositions, or biological systems, which are taken for granted as being evolving. It is further understood that the technical terms employed by the present specification are so employed as for description of the specific embodiments only, and are not meant to be limiting. The patents, patent applications, prior applications, and publications referenced or quoted by the present specification are wholly incorporated within the specification without being contradictory with the definite teachings of the present specification.

I claim:

1. A composition for improving quality of meat product, comprising
   an edible salt at a weight part of 4 to 30,
   a carbonate at a weight part of 1 to 15,
   an organic acid salt at a weight part of 0.1 to 15,
   a sugar alcohol at a weight part of 0.1 to 6,
   an isomaltulose or a trehalose at a weight part of 0.1 to 8,
   a chito-oligosaccharide composition at a weight part of 0.01 to 8,
   a fatty acid ester at a weight part of 0.01 to 1.0, and the fatty acid ester is selected from the group consisting of sorbitan fatty acid ester, glycerin fatty acid ester, propylene glycol fatty acid ester, sucrose fatty acid ester, and a combination thereof, and
   cyclodextrin at a weight part of 0.1 to 8.0,
   wherein ratio of the sugar alcohol to the isomaltulose or the trehalose is (0.3 to 16.7):1, and ratio of the fatty acid ester to the chito-oligosaccharide is (0.00125 to 100):1.

2. The composition of claim 1, wherein the carbonate is s a potassium carbonate, a potassium bicarbonate, a sodium carbonate, a sodium bicarbonate, or a combination thereof.

3. The composition of claim 1, wherein the organic acid salt is a sodium tartrate, a sodium gluconate, a sodium citrate, a sodium lactate, a sodium malate, a sodium alginate, a potassium malate, or a combination thereof.

4. The composition of claim 1, wherein the sugar alcohol is a xylitol, a mannitol, the isomaltulose, a lactitol, a hydrogenated starch hydrolysate, an erythritol, a sorbitol, a maltitol, or a combination thereof.

5. The composition of claim 1, wherein the chito-oligosaccharide composition is the chito-oligosaccharide alone or in a combination with one or more of an oligoisomaltose, a maltotriose, a soybean oligosaccharide, a raffinose, a stachyose, a fructo-oligosaccharide, a maltooligosaccharide, an isomaltose oligosaccharide, an oligo-galactose, a mannan-oligosaccharide, or a xylo-oligosaccharide.

6. The composition of claim 1, wherein the composition has a weight ratio of the edible salt: the carbonate: the organic acid salt: the sugar alcohol: the isomaltulose or the trehalose: the chito-oligosaccharide composition of (15 to 20): (6 to 9) :(1.1 to 1.8): (1.5 to 2.5): (0.15 to 5.0): (1.5 to 2.5).

7. The composition of claim 1, wherein the composition has a weight ratio of the edible salt: the carbonate: the organic acid salt: the sugar alcohol: the isomaltulose or the trehalose: the chito-oligosaccharide composition of 18:7: 1.6:2.2: (0.15 to 5.0):2.2.

8. The composition of claim 1, wherein a weight part of the fatty acid ester in the composition is 0.5 to 0.8.

9. The composition of claim 1, wherein a weight part of the cyclodextrin in the composition is 1 to 5.

10. A method for processing meat product according to claim 1, comprising
applying the composition of claim 1 to a meat product.

11. The method of claim 10, wherein the composition is applied to the meat product by means of spraying, injecting, pasting, soaking, mixing, rubbing, stirring, or smearing.

12. A meat product according to claim 1, comprising the composition of claim 1.

13. The composition for improving quality of meat product of claim 1, wherein the edible salt is at a weight part of 15 to 20, the carbonate is at a weight part of 6 to 9, the organic acid salt at a weight part of 1.1 to 1.8, the sugar alcohol is at a weight part of 1.5 to 2.5, the isomaltulose or the trehalose is at a weight part of 0.15 to 5.0, the chito-oligosaccharide composition is at a weight part of 1.5 to 2.5, the fatty acid ester is at a weight part of 0.5 to 0.8, and the cyclodextrin at a weight part of 1.0 to 5.0.

14. The composition for improving quality of meat product of claim 1, wherein the edible salt is at a weight part of 18, the carbonate is at a weight part of 7, the organic acid salt at a weight part of 1.6, the sugar alcohol is at a weight part of 2.0, the isomaltulose is at a weight part of 2.0, the trehalose is at a weight part of 1.0, the chito-oligosaccharide composition is at a weight part of 2.0, the fatty acid ester is at a weight part of 1.0, and the cyclodextrin at a weight part of 5.0.

* * * * *